US006826163B2

(12) United States Patent
Mani et al.

(10) Patent No.: US 6,826,163 B2
(45) Date of Patent: *Nov. 30, 2004

(54) METHOD AND APPARATUS FOR MULTIPLEXING IN A WIRELESS COMMUNICATION INFRASTRUCTURE

(75) Inventors: Sanjay Mani, Palo Alto, CA (US); David Cutrer, Fremont, CA (US)

(73) Assignee: NEXTG Networks, Milpitas, CA (US)

( * ) Notice: Subject to any disclaimer, the term of this patent is extended or adjusted under 35 U.S.C. 154(b) by 291 days.

This patent is subject to a terminal disclaimer.

(21) Appl. No.: 10/012,208

(22) Filed: Nov. 5, 2001

(65) Prior Publication Data

US 2002/0186674 A1 Dec. 12, 2002

Related U.S. Application Data

(63) Continuation-in-part of application No. 10/012,246, filed on Nov. 5, 2001, which is a continuation-in-part of application No. 10/012,264, filed on Nov. 5, 2001.
(60) Provisional application No. 60/296,781, filed on Jun. 8, 2001, and provisional application No. 60/313,360, filed on Aug. 17, 2001.

(51) Int. Cl.$^7$ ................................................ H04Q 7/00
(52) U.S. Cl. ...................... 370/334; 370/404; 370/537; 398/116; 455/422.1
(58) Field of Search .......................... 370/236.2, 238.1, 370/241.1, 310.1, 328, 330, 334, 396, 395.51, 395.52, 395.53, 400, 401, 403, 404, 405, 406, 407, 535, 536, 537; 455/436, 439, 422.1, 446, 447; 398/66, 116

(56) References Cited

U.S. PATENT DOCUMENTS 5,339,184 A  8/1994  Tang ........................... 359/124
5,400,391 A  3/1995  Emura et al. .................. 379/59

(List continued on next page.)

FOREIGN PATENT DOCUMENTS

| CA | 2215079     | * 9/1999 |              |
|----|-------------|----------|--------------|
| EP | 0 368 673   | 5/1988   | ............ H04Q/7/04 |
| EP | 0 476 569 A2| 9/1991   | ............ H04Q/7/04 |
| EP | 0 476 569 A2| 3/1992   | ............ H04Q/7/04 |
| GB | 2 354 674 A | 3/2001   | ............ H04Q/7/30 |
| WO | WO 94/00959 | 1/1994   | ............ H04Q/7/04 |

OTHER PUBLICATIONS

Castleford et al, Impact of Optical Crosstalk in Fibre–Radio Systems Incorporating WDM, IEEE, pp. 51–54, 2000.*
Ogawa et al, Novel Fiber Fed WDM Links for Millimeter–Wave Wireless Access Systems, IEEE, pp. 1213–1216, 1999.*

(List continued on next page.)

Primary Examiner—Frank Duong
(74) Attorney, Agent, or Firm—Paul Davis; Heller Ehrman White & McAulife

(57) ABSTRACT

A network is provided that includes a plurality of antennas coupled over the network to a plurality of base stations. The network can be optical or constructed with RF microwave links. The base stations are configured to provide cellular transmission. A plurality of links couple the plurality of antennas and the plurality of base stations. At least one link of the plurality of links provides multiple transmission paths between at least a portion of the base stations with at least a portion of the antennas.

81 Claims, 10 Drawing Sheets

U.S. PATENT DOCUMENTS

| | | | |
|---|---|---|---|
| 5,519,691 A | 5/1996 | Darcie et al. .................. 370/18 |
| 5,621,786 A * | 4/1997 | Fischer et al. .............. 455/436 |
| 5,627,879 A | 5/1997 | Russell et al. ............... 379/59 |
| 5,642,405 A | 6/1997 | Fischer et al. ................ 379/60 |
| 5,644,622 A | 7/1997 | Russell et al. .............. 455/422 |
| 5,650,679 A | 7/1997 | Boggs, III et al. |
| 5,657,374 A | 8/1997 | Russell et al. .............. 370/328 |
| 5,661,582 A | 8/1997 | Kintis et al. ................ 359/172 |
| 5,678,178 A | 10/1997 | Tahkokorpi ................ 455/33.1 |
| 5,682,382 A | 10/1997 | Shepard ...................... 370/342 |
| 5,740,289 A | 4/1998 | Glance ......................... 385/24 |
| 5,761,619 A | 6/1998 | Danne et al. .............. 455/422 |
| 5,809,395 A | 9/1998 | Hamilton-Piercy et al. .. 455/4.1 |
| 5,852,651 A | 12/1998 | Fischer et al. ............. 379/56.2 |
| 5,859,611 A | 1/1999 | Lam et al. .................. 342/368 |
| 5,890,055 A | 3/1999 | Chu et al. ..................... 455/16 |
| 5,917,970 A | 6/1999 | Burns et al. .................. 385/24 |
| 5,918,154 A | 6/1999 | Beasley ...................... 455/11.1 |
| 5,940,196 A | 8/1999 | Piehler et al. .............. 359/133 |
| 5,946,120 A | 8/1999 | Chen ........................... 359/158 |
| 5,978,117 A | 11/1999 | Koonen ...................... 359/125 |
| 6,016,426 A | 1/2000 | Bodell ......................... 455/422 |
| 6,069,721 A | 5/2000 | Oh et al. ..................... 359/145 |
| 6,075,631 A | 6/2000 | Bala et al. .................. 359/124 |
| 6,088,592 A | 7/2000 | Doner et al. ................ 455/447 |
| 6,107,954 A | 8/2000 | Li ................................. 342/54 |
| 6,111,676 A | 8/2000 | Lemus et al. ............... 359/124 |
| 6,134,443 A | 10/2000 | Spann et al. ................ 455/450 |
| 6,154,650 A | 11/2000 | Abidi et al. ................. 455/433 |
| 6,173,016 B1 | 1/2001 | Suzuki ........................ 375/295 |
| 6,175,560 B1 | 1/2001 | Bhagalia et al. ............ 370/342 |
| 6,175,734 B1 | 1/2001 | Desgagne et al. .......... 455/437 |
| 6,178,329 B1 | 1/2001 | Chao et al. .................. 455/452 |
| 6,181,948 B1 | 1/2001 | Kondo et al. ............... 455/517 |
| 6,185,246 B1 | 2/2001 | Gilhousen ................... 375/200 |
| 6,192,038 B1 | 2/2001 | Wallerius et al. ........... 370/328 |
| 6,205,133 B1 | 3/2001 | Bexten ........................ 370/343 |
| 6,310,705 B1 | 10/2001 | Lee et al. .................... 359/152 |
| 6,405,018 B1 | 6/2002 | Reudink et al. |
| 2001/0036163 A1 * | 11/2001 | Sabat et al. .................. 370/328 |
| 2002/0103012 A1 * | 8/2002 | Kim et al. ................... 455/562 |
| 2003/0153338 A1 | 8/2003 | Herz et al. |
| 2003/0165287 A1 | 9/2003 | Krill et al. |
| 2003/0198475 A1 | 10/2003 | Tiemann et al. |
| 2003/0226071 A1 | 12/2003 | Millar |
| 2004/0005897 A1 | 1/2004 | Tomoe et al. |
| 2004/0017785 A1 | 1/2004 | Zelst |
| 2004/0018018 A1 | 1/2004 | Izadpanah |
| 2004/0023692 A1 | 2/2004 | Posner et al. |
| 2004/0037565 A1 | 2/2004 | Young et al. |
| 2004/0037566 A1 | 2/2004 | Willebrand et al. |

OTHER PUBLICATIONS

Wu et al, A Radio–Over–Fiber Network for Microcellular System Application, IEEE, pp. 84–94, Feb. 1998.*

Goloubkoff et al, Outdoor and Indoor Applications for Broadband Local Loop with Fibre supported mm–wave Radio Systems, IEEE, pp. 31–34, 1997.*

Shibutani et al, Reflection Induced Degradation in Optical Fiber Feeder for Microcellular Mobile Radio Systems, IEICE, pp. 287–292, Feb. 1993.*

Arredondo et al, Techniques for Improving In–Building Radio Coverage Using Fiber–Fed Distributed Antenna Networks, IEEE, pp. 1540–1543, 1996.*

Cutrer et al, Dynamic Range Requirements for Optical Transmitters in Fiber–Fed Microcellular Networks, IEEE, pp. 564–566, May 1995.*

Greenstein et al, Microcells in Personal Communications Systems, IEEE, pp. 76–88, Dec. 1992.*

Project P816–PF, Implementation frameworks for integrated wireless optical access networks, pp. 1–66, Feb. 2000.*

Chu et al, Fiber Optic Microcellular Radio, IEEE, pp. 509–606, Aug. 1991.*

* cited by examiner

METHOD AND APPARATUS FOR MULTIPLEXING IN A WIRELESS COMMUNICATION INFRASTRUCTURE

CROSS-REFERENCE TO RELATED APPLICATIONS

This application claims the priority of U.S. Provisional Application No.: 60/296,781 filed Jun. 8, 2001 and U.S. Provisional Application No.: 60/313,360 filed Aug. 17, 2001. This application is also a continuation-in-part of U.S. Ser. No. 10/012,264 and a continuation-in-part of U.S. Ser. No. 10/012,246 both filed Nov. 5, 2001.

BACKGROUND OF THE INVENTION

1. Field of the Invention

This invention relates generally to cellular mobile telecommunication systems, and more particularly to a shared network to distribute base station antenna points and the associated base station transceiver hardware.

2. Description of Related Art

A conventional cellular telecommunications system has a fixed number of frequency channel sets distributed among base stations that serve a plurality of cells that are usually arranged in a predetermined reusable pattern. Typical cell areas range from 1 to 300 square miles. The larger cells can cover rural areas and smaller cells cover urban areas. Cell antenna sites utilizing the same channel sets are spaced by a sufficient distance to assure that co-channel interference is held to an acceptably low level.

A basic cellular network is comprised of mobile units, base stations, and a mobile switching center or mobile telecommunications switching office (MTSO). The mobile unit has radio telephone transceiver equipment that communicates over a radio station relays telephone signals between mobile units and an MTSO by way of communication lines. The cell site and the MTSO are typically connected by T1 lines, which carry telephone and control signals. The MTSO is also connected through paths to a switched telephone network.

An MTSO can include a switching network for establishing call connections between the public switched telephone network and mobile units located in cell sites and for switching call connections from one cell site to another. Additionally, the MTSO can include control systems for use in switching a call connection from one cell site to another. Various handoff criteria are known in the art, such as using received signal strength to indicate the potential desirability of a handoff. Also included in the MTSO is a central processing unit for processing data received from the cell sites and supervisory signals obtained from the network to control the operation of setting up and taking down call connections.

A conventional base station includes a radio controller unit that provides the interface between the T1 lines from the MTSO and the base station radio equipment. It also includes one or more transceivers, which perform radio transmit and receive functionality, and are in turn connected to antennas. A single transceiver radio often supports one channel or frequency allocation. The focus of this invention lies in placing a network between the transceiver radio and the antenna. Generally, the radio transmitter signals are then passed to a separate power amplifier for each channel, or the signals may be combined and applied to a single power amplifier. The output of the power amplifier is applied through a duplexer to an antenna, to be broadcast into the cellular area serviced by the base station.

Signals received in an antenna are applied through a duplexer to a filter. The filter isolates the entire cellular band signal from adjacent bands and applies it to receivers, one for each channel. The base station may optionally include a diversity antenna and corresponding diversity filters and a plurality of diversity receivers, one for each associated main receiver. Where implemented, the outputs of diversity receivers are applied to circuits include circuitry for selecting the strongest signal using known techniques. In densely populated urban areas, the capacity of a conventional system is limited by the relatively small number of channels available in each cell. Moreover, the coverage of urban cellular phone systems is limited by blockage, attenuation and shadowing of the RF signals by high rises and other structures. This can also be a problem with respect to suburban office buildings and complexes.

To increase capacity and coverage, a cell area can be subdivided and assigned frequencies reused in closer proximities at lower power levels. Subdivision can be accomplished by dividing the geographic territory of a cell, or for example by assigning cells to buildings or floors within a building. While such "microcell" systems are a viable solution to capacity and coverage problems, it can be difficult to find space at a reasonable cost to install conventional base station equipment in each microcell, especially in densely populated urban areas. Furthermore, maintaining a large number of base stations spread throughout a densely populated urban area can be time consuming and uneconomical.

A generic solution to this problem is to separate some components of the base station from the antenna node, and connect them with a link. The smaller footprint antenna node is located at the desired coverage location, while the rest of the base station is placed at a more accessible location. The link is generally fiber optic. The related art has approached this problem from two distinct positions: single link fiber fed repeaters and distributed base station architectures. Fiber fed repeaters generally separate the base station at the radio output to the antenna, employing a broadband transparent link which carries the RF uplink and downlink signals across the entire communication band, as distinct from a single channel or frequency allocation (FA). The broadband link can be analog or digital, but if digital, the digital signal transparently repeats the entire band, for example, the 12.5 MHz US Cellular A band. The link is point-to-point, one radio to one antenna. U.S. Pat. Nos. 5,627,879, 5,642,405, 5,644,622, 5,657,374 and 5,852,651 form a group which teach the implementation of cellular point-to-point links by employing a digital solution transparent to the communication protocol being employed.

The distributed base station solution, unlike the repeater solution, builds multi-link solutions. EP 0 391 597 discloses a simulcast network over optical fiber using analog carriers. In the network envisioned by this patent, multiple carriers are combined in the RF domain and then optically transported for simulcast transmission/reception out of a fiber-fed antenna array. The optical carrier is analog modulated with the RF signal. Dedicated fiber lines are used rather than optically multiplexed signals between remote antennas and the centralized base station, and the signals are not multiplexed between multiple base station radios and multiple antennas.

A distributed cellular network is disclosed in U.S. Pat. No. 5,519,691 in which radios are pooled at a common location and communication links connect the radios to distributed antenna units. A multiplexing method is provided for multiple channels on a cable or single optical carrier network, in which frequency division multiplexing in the RF domain is combined with analog signal transmission. The network is closely integrated with the base station, with channel allocation and manipulation at both host and remote ends of the network involving base station control. Provision is also made for time division multiplexing in the signal domain.

Another distributed cellular network is disclosed in U.S. Pat. No. 5,761,619. This network is closely integrated with the base station architecture. The base station radios are placed at a different point than the antennas, and the radio is assumed to be a digital unit which either performs a wideband digitization of the cellular band or filtering and a narrowband channel digitization. In this architecture, an optical network transports these digitized signals using a dynamic synchronous protocol. In this protocol, circuit paths are dynamically set up between remote antenna nodes and base stations using this protocol. A synchronous TDM protocol is used for signal multiplexing.

U.S. Pat. No. 6,205,133 B1 discloses a digital architecture that is similar to the one disclosed in U.S. Pat. No. 5,761,619. In this disclosed architecture, the concept of a software radio is used to build a distributed antenna system by modifying the base station architecture. The software radio transceivers are remotely located, and convert the RF signals into digital signals, which are transported over a digital link to a central hub station.

A distributed network architecture in which remote antenna units are connected to a base center holding base station radios is disclosed in EP0368673/WO 90/05432. In this architecture, a fiber optic distribution network is used to distribute RF signals between the base stations and the antennas. An interconnect switch is used to connect RF signals from different radios onto different optical carriers, and these carriers are combined and distributed by an optical fiber network. Analog RF optical modulation transmission is used but issues regarding constructing of a transparent 'air link' for carrying RF signals, which is required for cellular transmission, are ignored.

U.S. Pat. No. 5,400,391 describes a similar architecture to that of EP0368673, in which fiber pairs are used to connect distributed antennas to centralized radios, and an interconnection switch is used to flexibly direct signals between antenna nodes and radio transceivers. Dedicated fiber lines are used to connect base stations and remote nodes employing analog RF modulation of the optical signals.

Further, U.S. Pat. Nos. 5,978,117 and 5,678,178 disclose networks used to interconnect the base stations back to their respective MTSOs.

There is a need for a distributed network connecting base stations to remote antennas, and its method of use, that has a plurality of links with at least a portion providing multiple transmission paths. There is a further need for a distributed network connecting base stations to remote antennas, and its method of use, that has a plurality of links with at least one link providing multiple transmission paths employing multiple optical wavelength multiplexing. There is yet another need for a distributed network connecting base stations to remote antennas, and its method of use, that has a plurality of links with cellular signals are exchanged over the network are represented digitally. Yet there is another need for a distributed network connecting base stations to remote antennas where at least one base station or antenna location is geographically remote from the network and is connected to the network with a free space link. There is yet another need for a distributed network connecting base stations to remote antennas, that has a plurality of transmission paths that are shared between different cellular operators.

SUMMARY OF THE INVENTION

Accordingly, an object of the present invention is to provide a distributed network that connects base stations to remote antennas, and its method of use, that has a plurality of links with at least a portion providing multiple transmission paths.

Another object of the present invention is to provide a distributed network connecting base stations to remote antennas, and its method of use, that has a plurality of links with at least one link providing multiple transmission paths employing multiple optical wavelength multiplexing.

Yet another object of the present invention is to provide a distributed network connecting base stations to remote antennas, and its method of use, that has a plurality of links with cellular signals that are exchanged over the network and are represented digitally.

Another object of the present invention is to provide a distributed optical network connecting base stations to remote antennas, and its method of use, that has a plurality of links with at least one link providing multiple transmission paths by employing multiple optical fiber strands.

A further object of the present invention is to provide a distributed network connecting base stations to remote antennas, and its method of use, where at least one base station or antenna location is geographically remote from the network and is connected to the network with a free space link.

Another object of the present invention is to provide a distributed network, and its methods of use, that connects base stations to remote antennas, and has a plurality of transmission paths that are shared between different cellular operators.

These and other objects of the present invention are achieved in a network that includes a plurality of antennas optically coupled over the network to a plurality of base stations. The base stations are configured to provide cellular transmission. A plurality of links couple the plurality of antennas and the plurality of base stations. At least one link of the plurality of links provides multiple transmission paths between at least a portion of the base stations with at least a portion of the antennas.

In another embodiment of the present invention, a network includes a plurality of antennas RF coupled over the network to a plurality of base stations. The base stations configured to provide cellular transmission. A plurality of links couple the plurality of antennas and the plurality of base stations. At least one link of the plurality of links provides multiple transmission paths between at least a portion of the base stations with at least a portion of the antennas.

In another embodiment of the present invention, a network includes a plurality of antennas optically coupled over the network to a plurality of base stations. The base stations are configured to provide cellular transmission. A plurality of links couple the plurality of antennas and the plurality of base stations. At least one link of the plurality of links provides multiple transmission paths between at least a portion of the base stations with at least a portion of the antennas.

In another embodiment of the present invention, a network includes a plurality of antennas optically coupled over the network to a plurality of base stations. The base stations are configured to provide cellular transmission. A plurality of optical fiber links couple the plurality of antennas and the plurality of base stations. At least one link of the plurality of links provides multiple transmission paths over at least two optical wavelengths between at least a portion of the base stations with at least a portion of the antennas.

In another embodiment of the present invention, a network includes a plurality of antennas optically coupled over the network to a plurality of base stations. The base stations are configured to provide cellular transmission. A plurality of free space optical links couple the plurality of antennas and the plurality of base stations. At least one link of the plurality of links provides multiple transmission paths over at least two optical wavelengths between at least a portion of the base stations with at least a portion of the antennas.

In another embodiment of the present invention, a network includes a plurality of antennas optically coupled over the network to a plurality of base stations. The base stations are configured to provide cellular transmission. A plurality of free space links couple the plurality of antennas and the plurality of base stations. At least one link of the plurality of links provides multiple transmission paths between at least a portion of the base stations with at least a portion of the antennas. At least one base station or antenna location is geographically remote from the network and is connected to the network with a free space link.

In another embodiment of the present invention, a method of transmission provides a network with a plurality of links that couple a plurality of antennas with a plurality of base stations. Multiple transmission paths are provided between at least a portion of the base stations with at least a portion of the antennas. In another embodiment of the present invention, a method of transmission provides a network with a plurality of optical links that couple a plurality of antennas with a plurality of base stations. Multiple transmission paths are provided between at least a portion of the base stations with at least a portion of the antennas.

In another embodiment of the present invention, a method of transmission provides a network with a plurality of RF links that couple a plurality of antennas with a plurality of base stations. Multiple transmission paths are provided between at least a portion of the base stations with at least a portion of the antennas.

In another embodiment of the present invention, a method of transmission provides a network with a plurality of optical links that couple a plurality of antennas with a plurality of base stations. Multiple transmission paths are provided with at least one link of the plurality of links using optical DWDM between at least a portion of the base stations with at least a portion of the antennas.

In another embodiment of the present invention, a method of transmission provides a network with a plurality of optical links that couple a plurality of antennas with a plurality of base stations. Multiple transmission paths are provided with at least one link of the plurality of links using optical DWDM between at least a portion of the base stations with at least a portion of the antennas. The DWDM wavelength carriers carry an analog signal that is representative of an RF signal between the plurality of base stations and the plurality of antennas.

In another embodiment of the present invention, a method of transmission provides a network with a plurality of links that couple a plurality of antennas with a plurality of base stations. At least one base station or antenna location is geographically remote from the network and is connected to the network with a free space link. Multiple transmission paths are provided between at least a portion of the base stations with at least a portion of the antennas.

DETAILED DESCRIPTION

Figure 1:
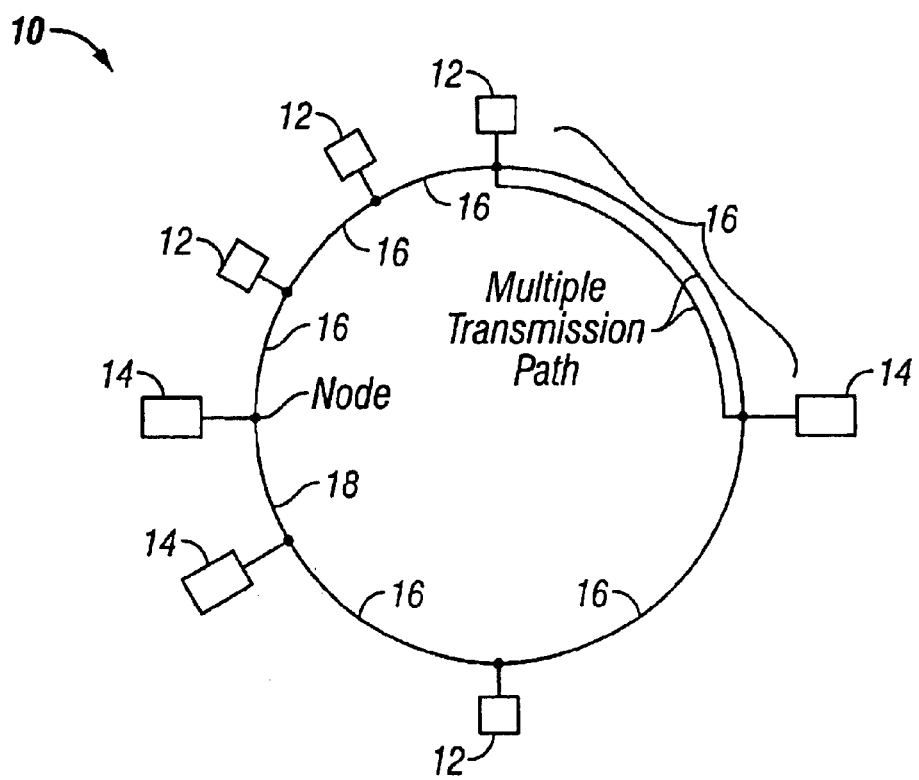
FIG. 1 is a schematic diagram of one embodiment of a distributed base station network with a plurality of antennas and base stations that has multiple transmission paths between at least a portion of the base stations with at least a portion of the antennas.

Referring to FIG. 1, one embodiment of the present invention is a network 10 that includes a plurality of antennas 12 that are optically coupled over network 10 to a plurality of base stations 14. Base stations 14 are configured to provide wireless cellular transmission. A plurality of links 16 couple the plurality of antennas 12 and the plurality of base stations 14. At least one link 18 of the plurality of links 16 provides multiple transmission paths between at least a portion of the plurality of base stations 14 with at least a portion of the plurality of antennas 12. In one embodiment, the plurality of antennas 12 and base stations 14 are coupled using RF links to form a network 10. By remotely locating the antenna 12 units from the base stations using such a network 10, numerous advantages are realized.

The plurality of links 16 can be configured to provide multiple transmission paths by frequency division multiplexing (FDM), time division multiplexing (TDM), and the like. Optically coupled networks can be configured to provide multiple transmission paths with wavelength division multiplexing (WDM) and/or multiple fiber strands that comprise a fiber cable. Both of these optical multiplexing techniques allow electrical isolation between different signals, because only the optical fiber and multiplexing components need be shared, not electrical components, optical transmitters, or optical receivers. TDM and FDM can both be combined with WDM to increase the number of transmission paths over a link. If the links 16 are RF microwave links, the multiple transmission paths can be different RF frequency channels.

Figure 2:
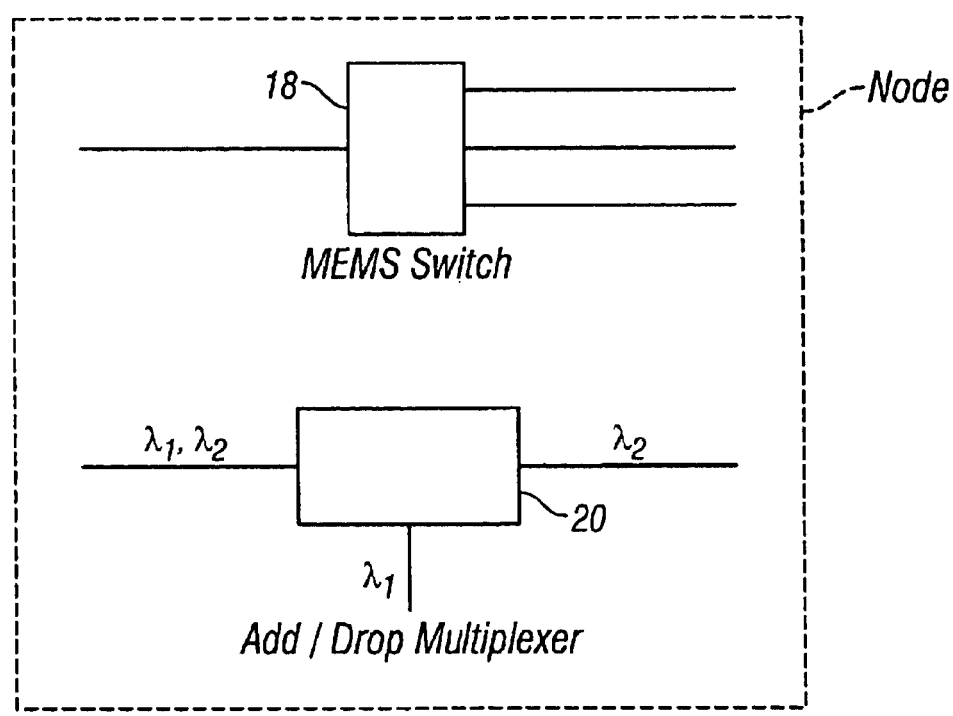
FIG. 2 is a schematic diagram of a MEMs switch and Add/Drop Multiplexer that can be used with the FIG. 1 network.
Figure 3:
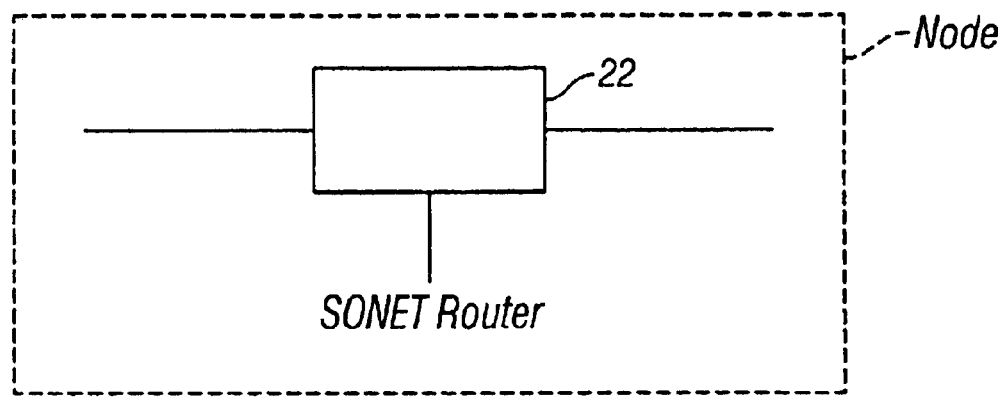
FIG. 3 is a schematic diagram of a SONET router that can be used with the FIG. 1 network.
Figure 4:
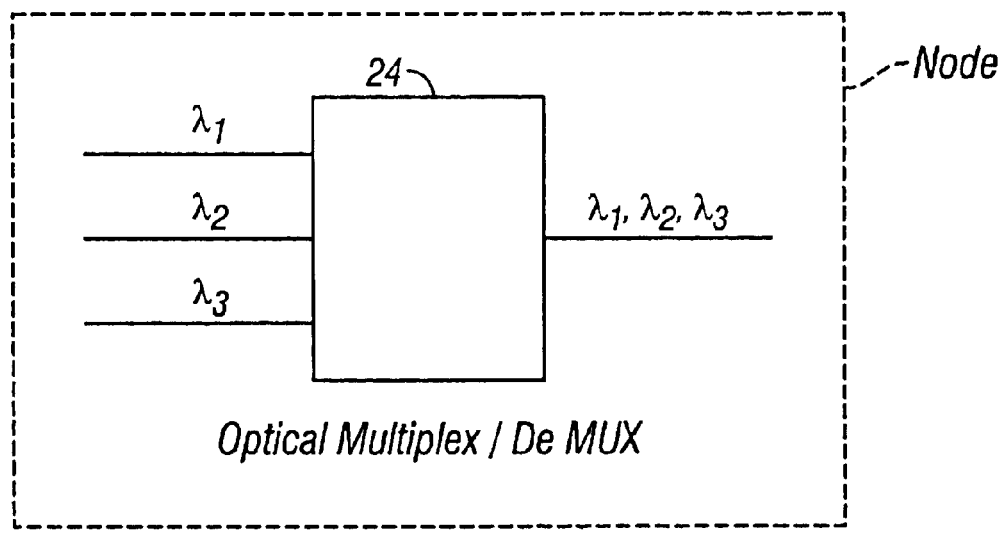
FIG. 4 is a schematic diagram of an optical multiplex/demultiplexer that can be used with the FIG. 1 network.

Optical WDM also allows multiplexing of different signals with very low latency, because no processing or switching operation need be performed, low latency optical directing components can be used exclusively. As illustrated in FIGS. 2, 3 and 4, optical multiplexing and routing can be performed with low latency passive or switching components including, but not limited to a MEMS switch 18, Add/Drop Multiplexer 20, Optical Multiplexer 24, and the like. Higher latency optical routing components such as a SONET router 22 can be used as well, if the latency budget is acceptable. FDM can also have low latency because RF mixing and combining are low latency operations, no processing or switching need be performed. Low latency is a desirable property for the invention, because placing a network between the antenna 12 and current base stations 14 places strict latency limitations on the network 10, as the network is now part of the conventional "air link" of a cellular system. This element of the link has strict latency constraints in modern cellular protocol standards, such as CDMA and GSM. However, other base station 14 embodiments can compensate for greater latency in this "air link" portion of the network 10, as it is a very small fraction of total latency in a wireless call. Such base stations permit much more flexible networking technology to be employed.

Figure 5:
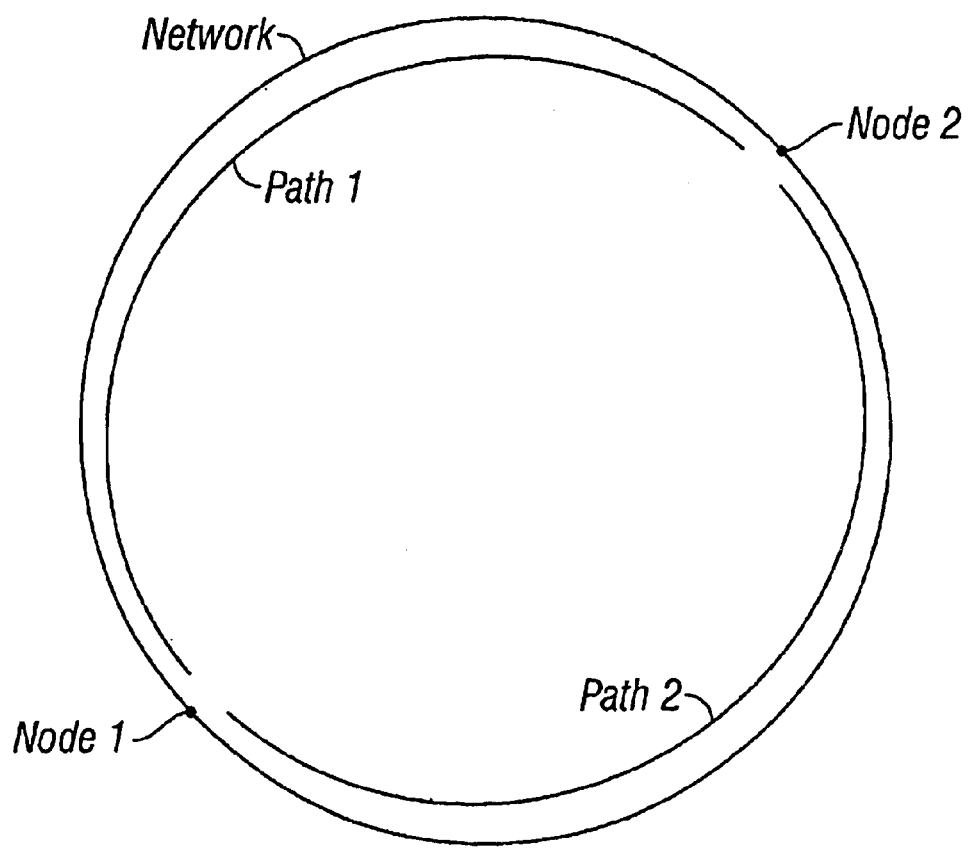
FIG. 5 is a schematic diagram of a DWDM transmission embodiment of the FIG. 1 network.

All or a portion of the links 16 can use optical FIG. 5 DWDM (Dense Wavelength Division Multiplexing) for transmission. At least one link 16 can provide multiple transmission paths employing digital transmissions and DWDM multiplexing between at least a portion of the base stations 14 with at least a portion of the antennas 12. DWDM ring networks also can employ protection mechanisms, which can be important in the implementation of this invention, because if a fiber link breaks, multiple cellular sites will go down. Such protection operates by routing the optical signal in the opposite direction along the ring if there is a break. This routing can be accomplished by switching the direction of transmission around the ring on detection of a break, or by always transmitting optical signals between nodes in both directions, creating two paths for redundancy in case of a fiber break.

Figure 6A:
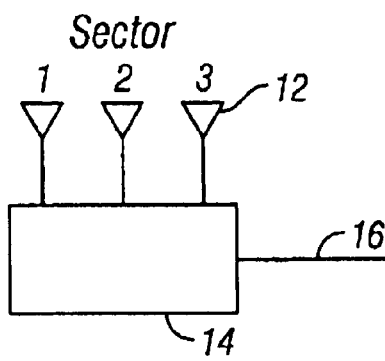
FIGS. 6a and 6b are schematic diagrams of a point-to-point TDM topology embodiment of the FIG. 1 network.
Figure 6B:
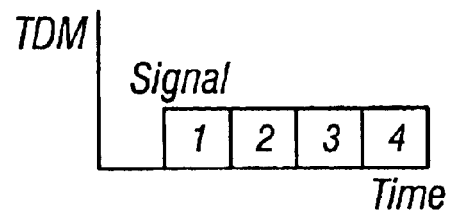

Some or all of the links 16 can use TDM (Time Division Multiplexing) to create the transmission paths. In one embodiment, the TDM employs SONET TDM techniques. In one embodiment, the TDM is specifically employed from one node to another node on the network 10 to carry multiple distinct RF signals in a point-to-point fashion. In a point-to-point TDM link, several signals are multiplexed together at an originating node, the multiplexed signal is then transported to the terminating node, and then the multiple signals are demultiplexed at the terminating node. Point-to-point TDM topology has the advantage of simplifying the multiplexing of multiple signals together, as opposed to adding and dropping low bit rate signals onto high bit rate carriers. Additionally, as illustrated in FIG. 6, the TDM link can carry multiple sectors of a base station 14. Further, the TDM link can carry multiple signals from different operators, carry diversity signals and be used to carry backhaul signals.

All or a portion of the links 16 can employ the SONET protocol, particularly using fixed optical paths. In such an embodiment, the SONET protocol is used to encode the signals, and then they are directed along fixed optical paths in a multiple wavelength optical network 10. A fixed optical path is one that is re-routed infrequently compared to the bit rate of the communication protocol employed over the path. This has the advantage of simplifying routing, since now only wavelengths need be routed. In a more flexible network 10, more complex SONET routing can be employed, for example, the links 16 can be multiplexed onto a SONET ring. In such a routing scheme, the multiplexing involves routing bits at the carrier bit rate of the ring, rather than routing optical wavelengths.

Different optical wavelengths in a fixed or switched optical path configuration can also employ other protocols. In one embodiment, at least a portion of the links 16 employ Fibre Channel, Gigabit Ethernet, TCP, ATM or another transmission protocol. In one embodiment, at least one optical wavelength carries OA&M signals and in another embodiment, at least one TDM channel carries OA&M signals.

Full SONET routing can be used over the network 10. In such a case, low bit rate cellular signals are added and dropped off of higher bit rate SONET links, with flexible signal routing. SONET's low latency, TDM functionality, and wide availability for optical networking implementations make it a useful protocol for this application. In other embodiments, IP routing is used. Routing protocols can be combined with traffic data to route signals as needed to optimize capacity between a group of base stations 14 and remote antenna 12 nodes.

Figure 7:
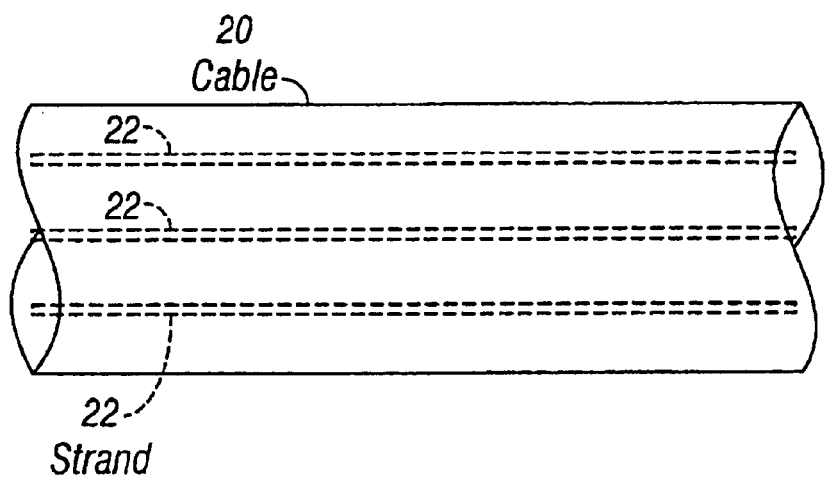
FIG. 7 is a schematic diagram of one fiber cable 20 with a plurality of fiber strands which from the multiple transmission paths of the FIG. 1 network.

As noted earlier, network 10 can provide optical multiplexing. In this embodiment, the plurality of links 16 includes a plurality of optical fiber links. As illustrated in FIG. 7, at least one fiber cable 20 can be included with a plurality of fiber strands 22 which form the multiple transmission paths. For example, a 192 count fiber cable could be used for 192 fiber strands, allowing 192 signals to be multiplexed on the cable with no other form of multiplexing. Clearly, multiple cables can be exploited in the same way as multiple strands. In another embodiment, at least one optical fiber strand 22 transmits at least two optical wavelengths that form multiple transmission paths. Preferably, all of the optical fiber strands 22 transmit more than one optical wavelength. As an example, 6 strands could carry 32 wavelengths each, providing 192 transmission paths. Beyond this, each path could have 4 signals multiplexed onto it employing TDM, providing 4×192 =768 transmission paths.

Figure 8:
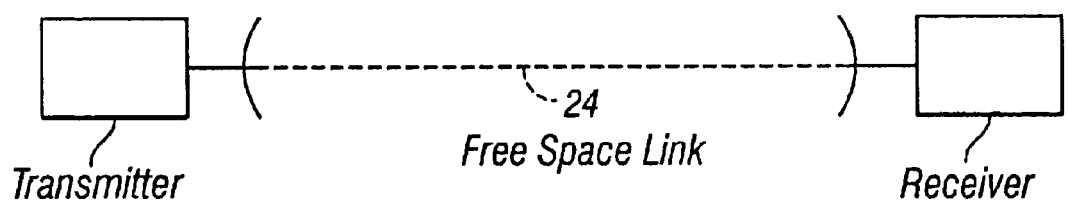
FIG. 8 is a schematic diagram of a FIG. 1 network that uses free space optical links.

Referring to FIG. 8, in other embodiments, the plurality of links 16 is a plurality of free space optical links 24. In such links, one or more optical wavelengths are directed through free space. Such links are useful to employ in areas where fiber is expensive or unavailable. The plurality of links 16 can include both optical fibers and free space optical links 24.

Figure 9:
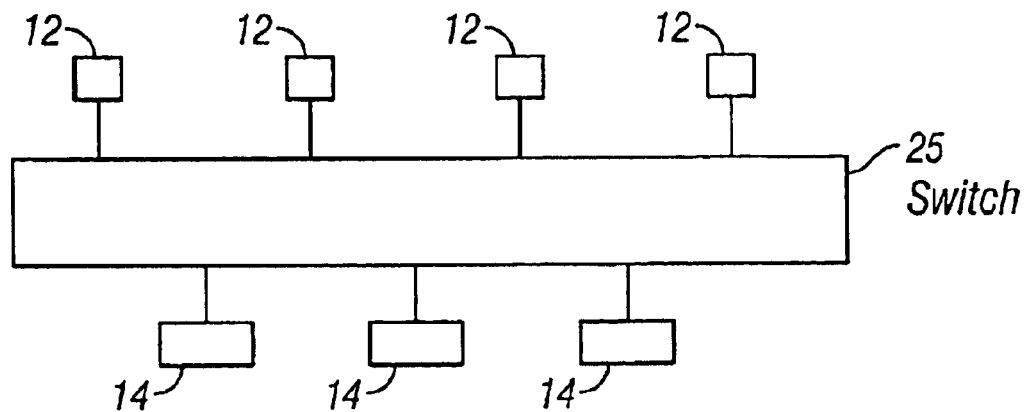
FIG. 9 is a schematic diagram of a FIG. 1 network where at least a portion of the links are configured to provide a selectable allocation of capacity to at least some of the base stations.

At least a portion of the plurality of links can be configured to provide selectable allocation of capacity to at least a portion of the plurality of base stations 14. This can be achieved with a control switching system 25. As illustrated in FIG. 9, such a system functions like a switch, in which the RF traffic from the antennas 12 are directed into it, and then redirected into base station 14 transceivers as needed. The switch 25 also takes the downlink channels and distributes them back to the antennas 12. The switch 25 can dynamically allocate the channel capacity of a group of base station transceivers to antennas 12 as needed. The capacity redirection switch 25 can be coordinated with the RF channel allocation, in order that the same frequencies are not used adjacent to each other. The switch allows the base station transceiver capacity to serve the entire geographic region covered by the antennas 12.

Figure 10:
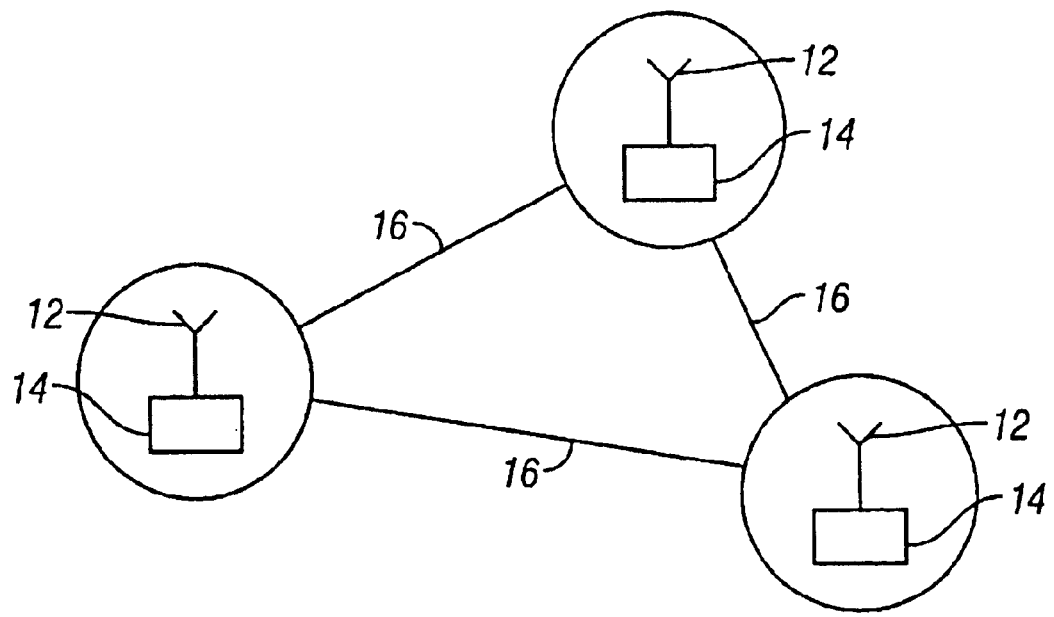
FIG. 10 is a schematic diagram of a FIG. 1 network that multiple base station 14 sites connected together.
Figure 11A:
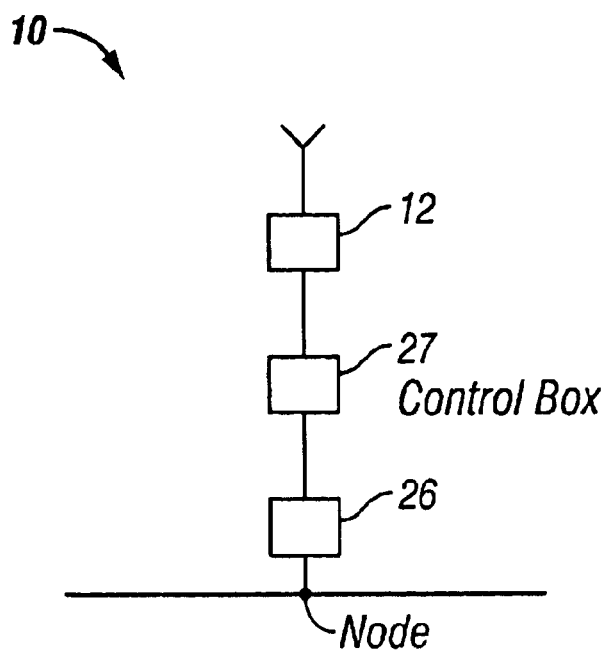
FIGS. 11a and 11b are schematic diagrams of a FIG. 1 network that includes a control box for at least a portion of the antennas in order to provide routing to selected base stations.
Figure 11B:
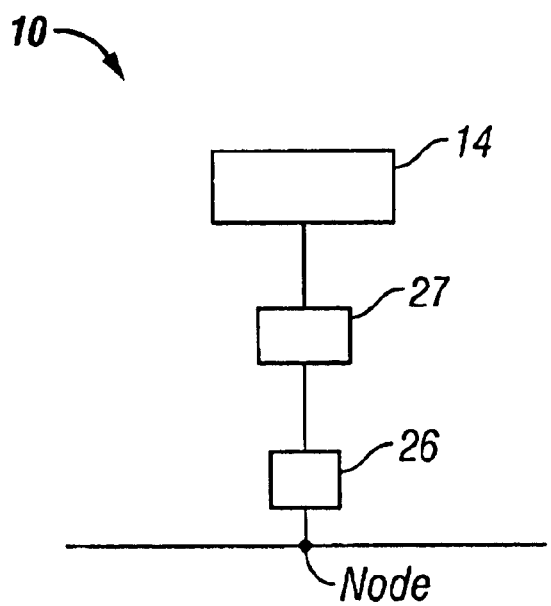

Referring to FIG. 10, a special case of shared base station transceiver capacity is to connect multiple existing base station 14 sites together, in order that the antennas 12 at these sites can be served by the transceiver capacity of all the base stations 14. The statistics of pooling transceiver capacity to cover larger geographic areas allows fewer base stations 14 to be used than if they were individually connected to single antennas. In addition, populations moving within the larger geographic area are covered by the same transceiver pool, which allows the number of transceivers to be sized with the population, not the geographic coverage area. This reduces the number of base stations 14 required to cover a given geographic area. In another embodiment shown in FIG. 11 a control box 27 can be included for each or a portion of the antennas 12 and provide routing to selected base stations 14. The routing by the control boxes 27 can be performed according to a desired schedule. For example, the switch could allocate more channels to highways during commute hours, and more channels to commercial office parks during business hours. One or all of the plurality of the links 16 can include a passive optical device 26. Suitable passive optical devices 26 include but are not limited to OADM's, filters, interleavers, multiplexers, and the like.

Figure 12:
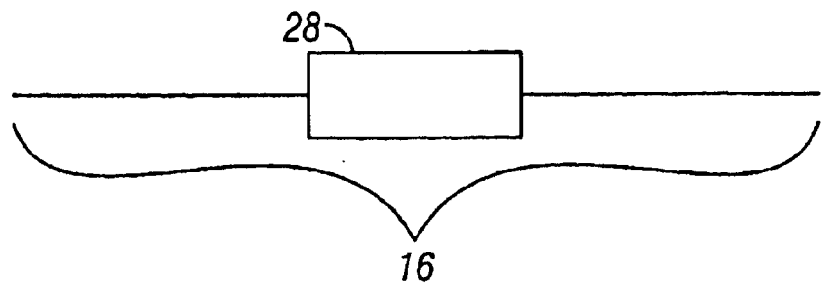
FIG. 12 is a schematic diagram of a FIG. 1 network with amplifiers included in the links.

All of only a portion of the plurality of links 16 can include one or more optical amplifiers 28, FIG. 12. Optical amplifiers 28 are low latency devices that amplify optical signals, overcoming optical losses from fiber and the use of optical components. Such amplifiers 28 are commercially available in configurations that amplify blocks of wavelengths, which makes DWDM optical networking more feasible, especially given the optical losses sustained in wavelength multiplexing.

The cellular signals exchanged over network 10 can be analog signals or digitized. Analog signals generally involve modulating a laser or optical modulator with the cellular RF signal, or a frequency converted version of this signal. Such implementations have the advantage of simplicity, and can take advantage of WDM, multiple fiber strands 22 on a given fiber cable 20, and FDM. However, for such transmission, the channel properties of the link 16, such as noise figure and spur-free dynamic range, directly impact the signal properties. DWDM networks experience linear and non-linear crosstalk, causing signal interference between different wavelength carriers. This can create problems with analog RF transmission. Digital signals are streams of bits, generated by digitally encoding the analog cellular signal. The analog cellular signal is the signal that would normally be transmitted or received by the base station or the remote mobile units. So a PCS CDMA signal could be an "analog cellular signal." It is not meant to imply that the signal is representative of an analog cellular standard. If the digital representation of the analog cellular signal is transmitted with a sufficient signal-to-noise ratio, it will not be significantly affected by link properties. Furthermore, these digital signals can be digitally protected with various strategies, such as encoding, parity, etc., to further reduce the likelihood of bit errors. By employing digital signals, there is a significant improvement in resistance to crosstalk. Hence DWDM and digital transmission is a powerful combination for exploiting the network 10 to carry the maximum number of cellular signals. Digital signals are furthermore amenable to the use of digital communications equipment and standards, such as routers, IP and SONET.

In one embodiment, the wavelength carriers carry an analog signal representative that is representative of an RF signal between multiple base stations 14 and antennas 12. Different carriers carry different cellular signals. In another embodiment, the wavelength carriers carry a digital signal that is representative of an RF signal between multiple base stations 14 and antennas 12. This digitization can be implemented in two preferred embodiments.

Figure 13:
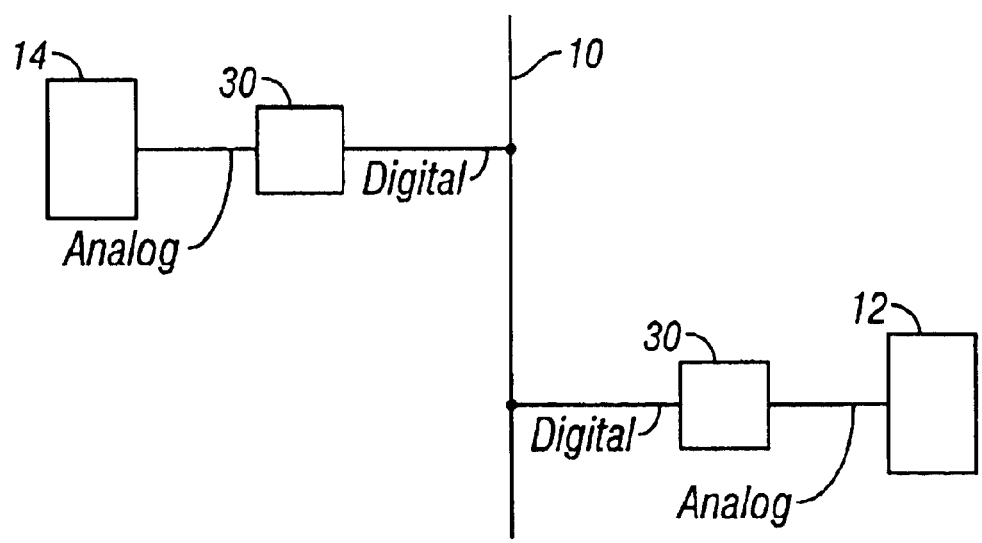
FIG. 13 is a schematic diagram of a FIG. 1 network that includes a digital transceiver embedded between a base station and the network on a base station side, and a digital transceiver embedded between an antenna and the network at an antenna side.

As illustrated in FIG. 13, a digital transceiver 30 is embedded between the base station 14 and the network 10 on the base station 14 side, and between the antenna 12 and the network 10 at the antenna 12 side. The coupling can be either a direct connection, or through one or more RF components such as an amplifier, attenuator, gain control block, and the like. The analog cellular signal, which is normally exchanged between these two units, is first converted into a digital signal by the digital transceiver, which is then exchanged over the network 10. After the digital cellular signal is received at the other end of the network, it is reconstituted by the digital transceiver as an analog cellular signal. This signal can be filtered, amplified, attenuated, and the like before being transmitted to the antenna 12, or the base station 14.

The other embodiment is to integrate the digital component into the base station 14 unit and the antenna 12 unit, and not use a separate digital transceiver. Although this can involve digitizing a wireless channel or frequency band, a more sophisticated implementation is to separate the functionality of the base station 14 unit and the antenna 12 unit at a point where the signal is itself digital. Given that the cellular RF signal is a digitally modulated signal, the voice channel is digitized, and base stations 14 are migrating to a digital transmit/receive architecture, there are several intermediate digital signals that could be exchanged. The antenna 12 units, when serving as remote units, can provide conventional base station 14 functionality such as baseband coding, channel coding, modulation/demodulation, channel filtering, band filtering and transmission reception and the like.

The general case is that each antenna 12 location can be configured to receive a downlink cellular signal as a digital stream input that is representative of a single or multiplicity of wireless channels or a segment of wireless spectrum. The antenna 12 then reconstructs and transmits the RF signal. Additionally, uplink cellular signals are received off-air at the antenna 12 that are representative of a single or a multiplicity of wireless channels from at least one mobile unit. At the antenna 12 node the uplink cellular signal is then converted into a single or plurality of bit streams. The bit streams are then transmitted over the network 10 to the base station 14 units. The base station 14 units receive this uplink digital signal and process it. Additionally, they transmit a downlink digital signal to the network 10.

When digital transceiver units are used to perform D/A and A/D functionality between antennas 12 and base stations 14, the analog signals can be frequency down converted before sampling and A/D conversion, and frequency up converted after D/A conversion The digital signal can be serialized before transmission and converted back to a parallel signal after transmission. High bit rates, including but not limited to those greater than 500 Mbps, can be employed to create high dynamic range links for improved cellular performance.

Figure 14:
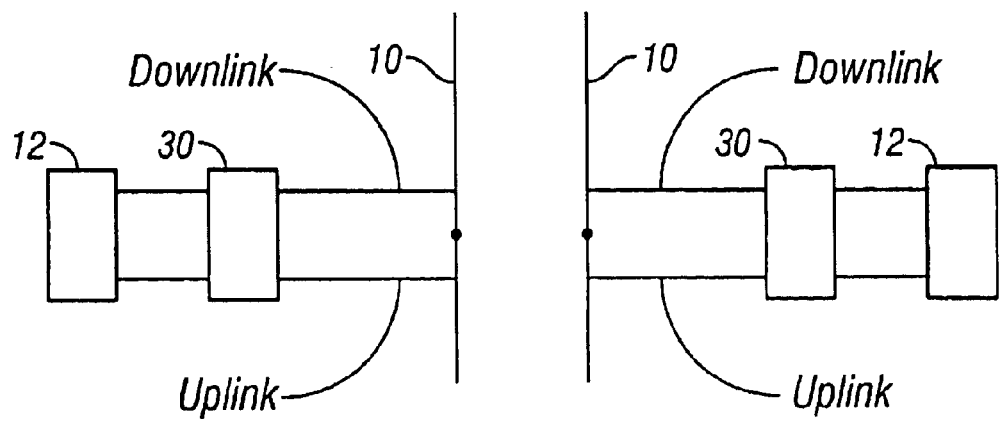
FIG. 14 is a schematic diagram of a FIG. 1 network illustrating transmission of down link and up link signals.

Referring to FIG. 14, when digital transceivers are employed, at the base station, the digital transceivers 30 digitize the downlink analog cellular signals that are representative of a wireless spectrum band or channel. Thereafter, the digital transceivers 30 pass the downlink digital cellular signals to the network 10. For the uplink at the base station, the digital transceivers 30 receive uplink digital signals representative of a wireless spectrum band or channel from the network, reconstruct the analog cellular signals, and then pass them to the base stations 14. At the antennas 12, for the uplink, the analog cellular signals received on the antenna 12 from the mobile units are converted into digital signals, and transmitted onto the network 10. The downlink digital signals are received by digital transceivers at the antenna 12, and then converted back into analog cellular signals representative of a wireless spectrum band or channel, and passed to the antenna 12.

In various embodiments, network 10 can have different layouts. In one embodiment, at least a portion of the plurality of the links 16 are fixed optical paths. Such paths involve connecting one or more remote nodes to one or more base nodes and rarely dynamically re-routing this path. The optical paths between antennas 12 and base stations 14 can have a one-to-one correspondence, connecting to one antenna 12 node and one base station 14 unit, or alternatively, one or more antennas 12 can be connected to one or more base stations 14 in a non one-to-one embodiment. In another embodiment, the transmission paths of network 10 can be dynamic-routable optical paths flexibly routed between one or a plurality of base stations 14 and one or a plurality of antennas 12.

Figure 15:
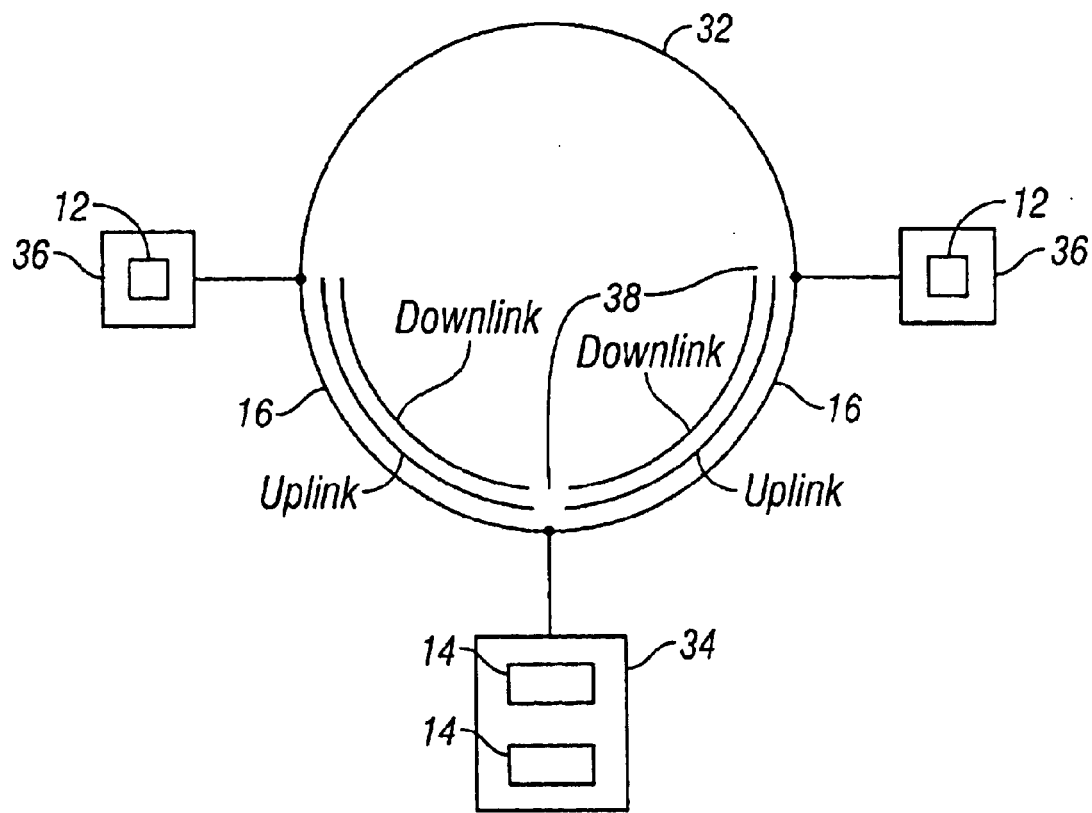
FIG. 15 is a schematic diagram of a hub and spoke embodiment of the FIG. 1 network.

As illustrated in FIG. 15, network 10 can be configured as a hub and spoke network 32. In this embodiment, the plurality of base stations 14 are located in a common node 34 and the plurality of antennas 12 are located at different remote nodes, generally denoted as 36 on the network 32. Optical uplink and downlink connections are spokes 38 that connect the common node 34 and the remote nodes 36. Network 32 can also include at least one set of nodes 40 containing the base stations 14 and/or antennas 12 which are connected by one or more links 16 that are laid out on a segment or a ring. Whether on a segment or a ring, in a preferred implementation the uplink and downlink should be transmitted in opposite directions to equalize the latency, which is important in cellular transmission.

Figure 16:
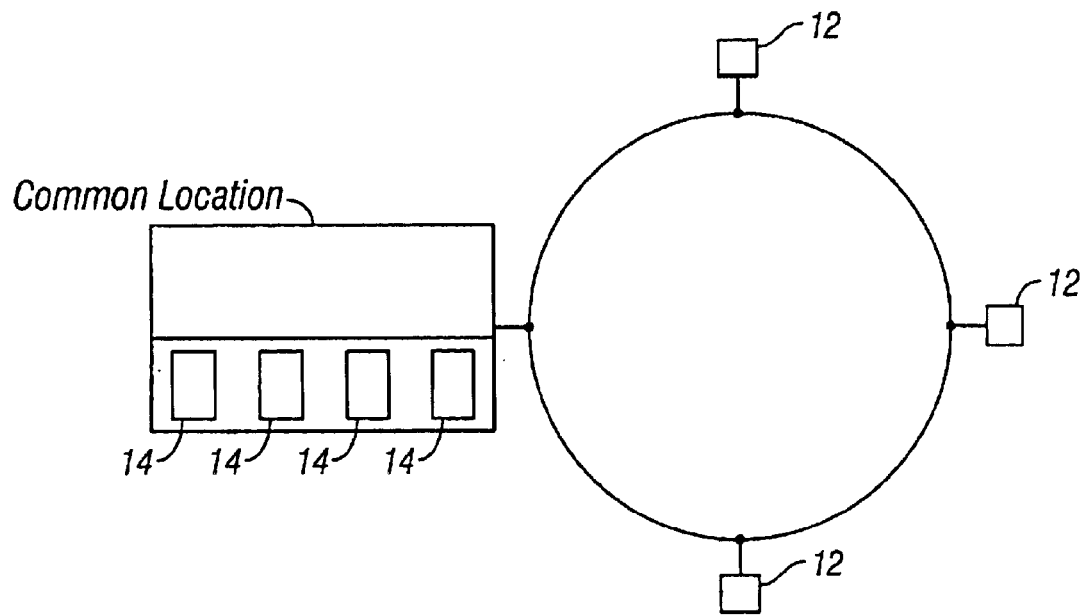
FIG. 16 is a schematic diagram of a FIG. 1 network with at least two base stations located in a common location and the antennas geographically dispersed.

In one embodiment, at least two of the base stations 14 are located in a common location and the antennas 12 are geographically dispersed, FIG. 16. Suitable common locations include but are not limited to an environmentally controlled room in a building connected to the network 10. The antennas 12 are placed in areas providing the desired coverage which may have higher real estate costs and/or lower available footprints than the common location, but which can be connected to the network 10.

In various embodiments, at least one link of the plurality of links 16 can be, shared by at least two operators. The operators can be wireless operators, different spectrum bands used by a same cellular operator, different entities. This different operators need not share electrical components when using an optical network. Different operators can be multiplexed onto the network using any of the multiplex methods detailed previously. In a preferred implementation, the different operators can use different optical fibers strands, or different optical wavelengths on the same fiber strand. In another preferred implementation, different operators can employ different wavelengths on free space links. By optically multiplexing multiple operators on the same network 10, the operators can share the costs of constructing, acquiring and maintaining the network 10 without compromising their electrical isolation requirements. In one embodiment, the network 10 can be used to connect together existing base station 14 sites for different operators, and used to extend coverage from one operator to all other operators.

Figure 17:
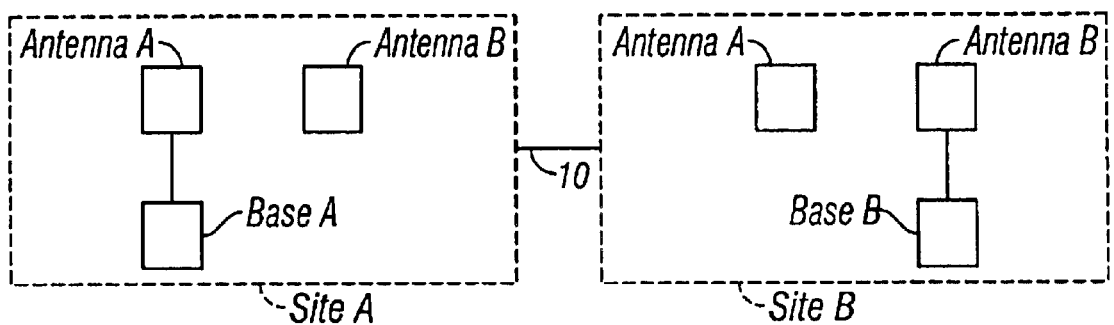
FIG. 17 is a schematic diagram of a FIG. 1 network with base stations connected together for different operators and used to extend coverage from each operator to other operators.

For example, as illustrated in FIG. 17, a site built by operator A at site A is connected to a site built by operator B at site B. An antenna 12 for A is placed at site B, connected to a base station 14 for operator A at site A, and an antenna 12 for operator B is placed at site A, connected to a base station 14 for operator B at site B.

In various embodiments, the links 16 provide that at least one optical carrier carries at least one backhaul signal from a base station 14 to a switch (such as an MTSO) or a bridge network. In an RF network, where the links 16 are RF links, the links 16 can be configured to provide that at least one RF carrier carries at least one backhaul signal from a base station 14 to one of a switch (such as an MTSO) or a bridge network.

Figure 18:
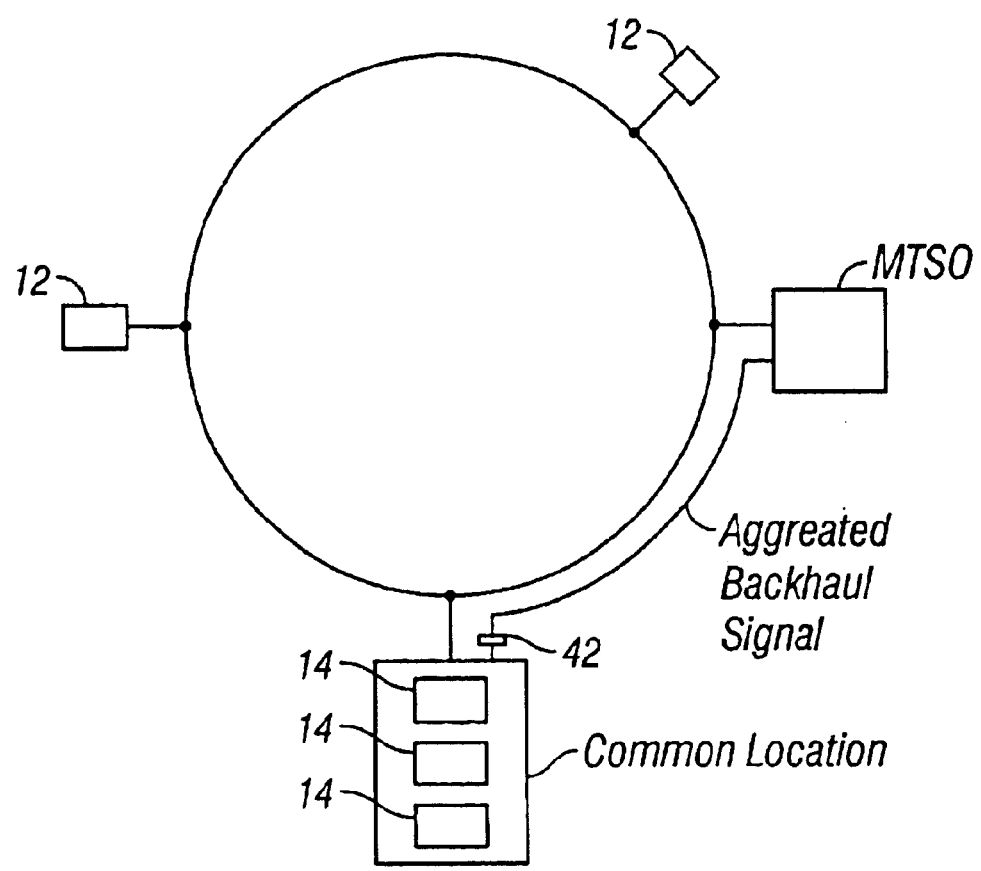
FIG. 18 is a schematic diagram of a FIG. 1 network that directly connects to an MTSO.

Referring now to FIG. 18, the network 10 can be an optical network that directly connects to a switch 42, including but not limited to an MTSO. Multiple backhaul signals from several base stations can be integrated into one higher bit rate backhaul signal. This allows the network 10 costs to be shared amongst backhaul signals as well, and allows for high bandwidth backhaul to be performed, which is cheaper per bit. The backhaul signals can be digital t-carriers, SONET signals, and the like. Non-backhaul RF signals that share the network 10 with the backhaul signal can be represented digitally to minimize the effects of crosstalk with the digital backhaul signal. Non-backhaul RF signals can have a large wavelength separation from the backhaul signal in order to minimize the effects of crosstalk with the digital backhaul signal.

Some antenna 12 or base station 14 locations are difficult to connect to a network, especially an optical fiber network, because no fiber may exist to the site. In an embodiment of the invention, such a location can be connected to the network 10 with a free space link, either a free space optical link 16 or microwave link 16. This link 16 can be analog or digital, and if digital can be formatted in a proprietary fashion, or as a T-carrier or SONET link.

The foregoing description of preferred embodiments of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A network, comprising:
   a plurality of antennas optically coupled over the network to a plurality of base transceiver stations, the base transceiver stations configured to provide cellular transmission;
   a plurality of links that couple the plurality of antennas and the plurality of base transceiver stations, at least one multiple transmission path link of the plurality of links providing multiple transmission paths between at least a portion of the base transceiver stations with at least a portion of the antennas, at least a portion of the plurality of links providing optical multiplexing of multiple operators;

at least one optical add/drop multiplexer (OADM) coupled to the at least one multiple transmission path link, the OADM capable of selecting at least one wavelength transmitted on the at least one multiple transmission link, while passing other wavelengths; and wherein one of the transmission paths between one of the base transceiver stations and one of the antennas passes through the OADM prior to reaching the one of the antennas.

2. The network of claim 1, wherein the cellular signals exchanged over the network are analog signals.

3. The network of claim 1, wherein the plurality of links are configured to provide multiple transmission paths by frequency division multiplexing.

4. The network of claim 3, wherein the cellular signals exchanged over the network are analog signals.

5. The network of claim 1, wherein the plurality of links are configured to provide multiple transmission paths by time division multiplexing.

6. The network of claim 1, wherein at least a portion of the plurality of links included a plurality of passive optical devices.

7. The network of claim 6, wherein the plurality of passive optical devices are OADMs.

8. The network of claim 6, wherein the plurality of passive optical devices are filters.

9. The network of claim 6, wherein the plurality of passive optical devices are interleavers.

10. The network of claim 6, wherein the plurality of passive optical devices are multiplexers.

11. The network of claim 1, wherein at least a portion of the plurality of links includes one or more active optical switching devices.

12. The network of claim 11, wherein one or more active optical switching devices are MEMS based switches.

13. The network of claim 1, wherein at least a portion of the plurality of links includes at least one optical amplifier.

14. The network of claim 1 wherein at least a portion of the plurality of the links are fixed optical paths, wherein each of a fixed optical path is a stationary optical link between one or more base transceiver stations and one or more antennas that is rerouted on a time scale much slower than that of the bit rate over the link, and so connects nodes to one another as a virtual circuit.

15. The network of claim 14 wherein the fixed optical paths connect antennas and base transceiver stations with a one-to-one correspondence.

16. The network of claim 14 wherein the fixed optical paths connect one or more antenna of the plurality of antennas to one or more base transceiver stations of the plurality of base transceiver stations.

17. The network of claim 14 wherein the optical network is configured as a hub and spoke network, wherein the plurality of base transceiver stations are located in a common node and the plurality of antennas are located at different remote nodes on the network.

18. The network of claim 17, wherein optical uplink and downlink connections are spokes connecting a common hub node and remote nodes.

19. The network of claim 1, wherein the optical network includes at least one set of nodes containing base transceiver stations or antennas connected by at least one link laid out along a segment.

20. The network of claim 1, wherein the optical network includes at least one set of nodes containing base transceiver stations or antennas connected by at least one link laid out along a ring.

21. The network of claim 1, wherein the plurality of transmission paths are configured to provide uplink transmission traveling in a first direction and downlink transmissions traveling in an opposite second direction.

22. The network of claim 1, in which at least a portion of the plurality of the multiple transmission paths are dynamic routable optical paths.

23. The network of claim 1, wherein at least a portion of the plurality of the multiple transmission paths can be flexibly routed between at least one of the plurality of base transceiver stations and at least one of the plurality of antennas.

24. The network of claim 1, wherein the plurality of links are configured to provide that at least one optical link carries at least one backhaul signal from a base transceiver station of the plurality of base transceiver stations to a switch or a bridge network.

25. The network of claim 24, wherein the network is an optical network constructed to provide a direct connection to a switch location.

26. The network of claim 24, wherein backhaul signals of the plurality of base transceiver stations are aggregated into a single higher bit rate backhaul signal carried by the network.

27. The network of claim 24, wherein backhaul signals of the plurality of base transceiver stations are selected from a digital SONET, Gigabit Ethernet, Fibre Channel, TCP, and T-Carrier format signal.

28. The network of claim 24, wherein non-backhaul RF signals have a large wavelength separation from the backhaul signal to minimize the effects of cross talk with a digital backhaul signal.

29. A network, comprising:

a plurality of antennas coupled over the network to a plurality of base transceiver stations, the base transceiver stations configured to provide cellular transmission;

a plurality of links that couple the plurality of antennas and the plurality of base transceiver stations, at least one link of the plurality of links configured to permit multiple operators to use the at least one link at the same time, at least one link of the plurality of links providing multiple transmission paths between at least a portion of the base transceiver stations with at least a portion of the antennas, at least a portion of the plurality of links providing optical multiplexing of multiple operators;

at least one optical add/drop multiplexer (OADM) coupled by one of the links to one of the antennas, the OADM capable of selecting at least one wavelength transmitted on the link, while passing other wavelengths; and wherein one of the transmission paths between one of the base transceiver stations and one of the antennas passes through the OADM prior to reaching the one of the antennas.

30. The network of claim 29, wherein the plurality of links are configured to provide multiple transmission paths by frequency division multiplexing.

31. The network of claim 29, wherein cellular signals exchanged over the network are analog signals.

32. The network of claim 31, wherein multiple transmission paths are created with frequency division multiplexing.

33. The network of claim 32, wherein the plurality of links are configured to carry one or more backhaul signals that are frequency division multiplexed on at least one RF link from one or more base transceiver stations of the plurality of base transceiver stations to a switch or a bridge network.

34. The network of claim 29, wherein the plurality of links are configured to provide that at least one RF link carries at least one backhaul signal from a base transceiver station of the plurality of base transceiver stations to a switch or a bridge network.

35. The network of claim 34, wherein backhaul signals of the plurality of base transceiver stations are aggregated into a single higher bit rate backhaul signal carried by the network.

36. The network of claim 34, wherein backhaul signals of the plurality of base transceiver stations are selected from a digital T-carrier, SONET, STS, TCP and Gigabit Ethernet format signal.

37. A network, comprising:
    a plurality of antennas optically coupled over the network to a plurality of base transceiver stations, the base transceiver stations configured to provide cellular transmission;
    a plurality of optical fiber links that couple the plurality of antennas and the plurality of base transceiver stations, at least one link of the plurality of optical fiber links configured to permit multiple operators to use the at least one link at the same time, at least one link of the plurality of optical fiber links providing multiple transmission paths between at least a portion of the base transceiver stations with at least a portion of the antennas, at least a portion of the plurality of links providing optical multiplexing of multiple operators;
    at least one optical add/drop multiplexer (OADM) coupled by one of the links to one of the antennas, the OADM capable of selecting at least one wavelength transmitted on the link, while passing other wavelengths; and
    wherein one of the transmission paths between one of the base transceiver stations and one of the antennas passes through the OADM prior to reaching the one of the antennas.

38. The network of claim 37, wherein the plurality of links includes at least one fiber cable with a plurality of fiber strands which form multiple transmission paths.

39. A network, comprising:
    a plurality of antennas optically coupled over the network to a plurality of base transceiver stations, the base transceiver stations configured to provide cellular transmission;
    a plurality of optical fiber links that couple the plurality of antennas and the plurality of base transceiver stations, at least one link of the plurality of links providing multiple transmission paths over at least two optical wavelengths between at least a portion of the base transceiver stations with at least a portion of the antennas, at least a portion of the plurality of links providing optical multiplexing of multiple operators;
    at least one optical add/drop multiplexer (OADM) coupled by one of the links to one of the antennas, the OADM capable of selecting at least one wavelength transmitted on the link, while passing other wavelengths; and
    wherein one of the transmission paths between one of the base transceiver stations and one of the antennas passes through the OADM prior to reaching the one of the antennas.

40. The network of claim 39, wherein cellular signals exchanged over the network are analog signals.

41. The network of claim 40, wherein additional transmission paths are created with frequency division multiplexing.

42. The network of claim 40, wherein the plurality of optical fiber links are configured to provide one or more backhaul signals frequency division multiplexed as a subcarrier on at least one optical carrier from at least one base transceiver station of the plurality of base transceiver stations to a switch or a bridge network.

43. The network of claim 39, wherein cellular signals exchanged over the network are digital signals.

44. A network, comprising:
    a plurality of antennas optically coupled over the network to a plurality of base transceiver stations, the base transceiver stations configured to provide cellular transmission;
    a plurality of free space optical links that couple the plurality of antennas and the plurality of base transceiver stations, at least a portion of the plurality of free space optical links providing optical multiplexing of multiple operators; at least one free space optical link of the plurality of free space optical links providing multiple transmission paths over at least two optical wavelengths between at least a portion of the base transceiver stations with at least a portion of the antennas;
    at least one optical add/drop multiplexer (OADM) coupled by one of the links to one of the antennas, the OADM capable of selecting at least one wavelength transmitted on the link, while passing other wavelengths; and
    wherein one of the transmission paths between one of the base transceiver stations and one of the antennas passes through the OADM prior to reaching the one of the antennas.

45. The network of claim 44, wherein the cellular signals exchanged over the network are analog signals.

46. The network of claim 45, wherein the plurality of free space optical links are configured to provide a backhaul signal frequency division multiplexed as a subcarrier on at least one optical carrier from a base transceiver station of the plurality of base transceiver stations to a switch or a bridge network.

47. The network of claim 45, wherein additional transmission paths are created with frequency division multiplexing multiple signals onto the same optical carrier.

48. The network of claim 44, wherein cellular signals exchanged over the network are digital signals.

49. A network, comprising:
    a plurality of antennas optically coupled over the network to a plurality of base transceiver stations, the base transceiver stations configured to provide cellular transmission;
    a plurality of free space links that couple the plurality of antennas and the plurality of base transceiver stations, at least a portion of the plurality of free space links providing optical multiplexing of multiple operators, at least one free space link of the plurality of free space links providing multiple transmission paths between at least a portion of the base transceiver stations with at least a portion of the antennas,
    at least one base transceiver station or antenna location being geographically remote from the network and is connected to the network with a free space link;

at least one optical add/drop multiplexer (OADM) coupled by one of the links to one of the antennas, the OADM capable of selecting at least one wavelength transmitted on the link, while passing other wavelengths; and wherein one of the transmission paths between one of the base transceiver stations and one of the antennas passes through the OADM prior to reaching the one of the antennas.

50. The network of claim 49, wherein cellular signals transported over the plurality of free space links are represented digitally.

51. The network of claim 49, wherein at least a portion of the plurality of free space links are RF links.

52. The network of claim 49, wherein at least a portion of the plurality of free space links are optical links.

53. The network of claim 49, wherein cellular signals transported over the plurality of free space links are represented as analog signals.

54. A method of transmission, comprising:

providing a network with a plurality of optical links that couple a plurality of antennas with a plurality of base transceiver stations, the network including at least one optical add/drop multiplexer (OADM) coupled by one of the optical links to one of the antennas;

providing multiple transmission paths between at least a portion of the base transceiver stations with at least a portion of the antennas;

using the OADM to select at least one wavelength transmitted on the optical link, while passing other wavelengths, one of the transmission paths between one of the base transceiver stations and one of the antennas passing through the OADM prior to reaching the one of the antennas; and at least a portion of the plurality of optical links providing optical multiplexing of multiple operators.

55. A method of transmission, comprising:

providing a network with a plurality of links that couple a plurality of antennas with a plurality of base transceiver stations, the network including at least one optical add/drop multiplexer (OADM) coupled by one of the links to one of the antennas;

providing multiple transmission paths between at least a portion of the base transceiver stations with at least a portion of the antennas;

using the OADM to select at least one wavelength transmitted on the link, while passing other wavelengths, one of the transmission paths between one of the base transceiver stations and one of the antennas passing through the OADM prior to reaching the one of the antennas; and at least a portion of the plurality of links providing optical multiplexing of multiple operators.

56. A method of transmission, comprising:

providing a network with a plurality of optical links that couple a plurality of antennas with a plurality of base transceiver stations; the network including at least one optical add/drop multiplexer (OADM) coupled by one of the links to one of the antennas;

providing multiple transmission paths with at least one optical link of the plurality of optical links using optical DWDM between at least a portion of the base transceiver stations with at least a portion of the antennas;

using the OADM to select at least one wavelength transmitted on the optical link, while passing other wavelengths, one of the transmission paths between one of the base transceiver stations and one of the antennas passing through the OADM prior to reaching the one of the antennas; and at least a portion of the plurality of the optical links providing optical multiplexing of multiple operators.

57. The method of claim 56, wherein at least one optical wavelength carries OA&M signals.

58. The method of claim 56, further comprising:

using DWDM protection techniques to provide protection or redundancy between a base transceiver station node and a remote antenna node.

59. The method of claim 58, where the protection is employed for a fiber break.

60. The method of claim 58, where the protection is employed for an equipment failure.

61. The method of claim 58 wherein the DWDM protection is provided by switching the direction of optical beam transmission to the opposite direction around a ring connecting a base transceiver station node to a remote node in the event of a problem along an original transmission path.

62. The method of claim 58 wherein the DWDM protection is provided by transmitting optical beams simultaneously in both directions around a ring connecting the base transceiver station and the remote node, so that if one side breaks, the other connection allows for continued operation.

63. A method of transmission, comprising:

providing a network with a plurality of optical links that couple a plurality of antennas with a plurality of base transceiver stations; the network including at least one optical add/drop multiplexer (OADM) coupled by one of the links to one of the antennas;

providing multiple transmission paths with at least one link of the plurality of links using optical DWDM between at least a portion of the base transceiver stations with at least a portion of the antennas;

the DWDM wavelength carriers carrying an analog signal representative of an RF signal between the plurality of base transceiver stations and the plurality of antennas;

using the OADM to select at least one wavelength transmitted on the optical link, while passing other wavelengths, one of the transmission paths between one of the base transceiver stations and one of the antennas passing through the OADM prior to reaching the one of the antennas; and at least a portion of the plurality of optical links providing optical multiplexing of multiple operators.

64. The method of claim 63, further comprising:

providing optical carriers at a sufficiently wide wavelength spacing to minimize effects of linear and non-linear crosstalk between optical carriers on a cellular signal being carried by the network.

65. The method of claim 63, further comprising:

placing different wireless telecommunications operators on different optical wavelengths.

66. The method of claim 63, wherein the network includes low latency optical devices for routing.

67. The method of claim 63, wherein the multiple transmission paths are created on an optical link by frequency division multiplexing different cellular signals onto a same optical carrier.

68. The method of claim 63, further comprising;

using frequency division multiplexing to carry a backhaul signal and a cellular signal on a same optical wavelength.

69. A method of transmission, comprising:

providing a network with a plurality of links that couple a plurality of antennas with a plurality of base transceiver stations, wherein at least one base transceiver station or antenna location is geographically remote from the network and is connected to the network with a free space link, the network including at least one optical add/drop multiplexer (OADM) coupled by one of the links to one of the antennas; and providing multiple transmission paths between at least a portion of the base transceiver stations with at least a portion of the antennas;

using the OADM to select at least one wavelength transmitted on the link, while passing other wavelengths, one of the transmission paths between one of the base transceiver stations and one of the antennas passing through the OADM prior to reaching the one of the antennas; and at least a portion of the plurality of links providing optical multiplexing of multiple operators.

70. The method of claim 69, wherein the free space link is an RF link.

71. The method of claim 69, wherein the free space link is an optical link.

72. The method of claim 69, further comprising:

frequency division multiplexing multiple cellular signals onto the free space link.

73. The method of claim 69, further comprising:

transporting a digital signal over the free space link representing the cellular signal.

74. The method of claim 73, wherein the digital signal is generated by digitizing a wireless band.

75. The method of claim 73, wherein the digital signal is placed in a format selected from SONET, Gigabit Ethernet, Fibre Channel, TCP, and T-Carrier.

76. The method of claim 73, wherein the digital signal is multiplexed into the network without converting it back into an analog signal.

77. The method of claim 73, wherein the digital transmitted over the free space link is time division multiplexed onto the network.

78. The method of claim 77, wherein the digital signal is multiplexed onto the network with a SONET device.

79. The method of claim 69 wherein different cellular operators share the free space link using different transmission paths.

80. The method of claim 79 wherein the free space link is RF and the multiple transmission paths are provided with frequency division multiplexing.

81. The method of claim 79 wherein the free space link is optical and the multiple transmission paths are different wavelengths.

* * * * *